United States Patent
Bonam et al.

(10) Patent No.: US 10,437,951 B2
(45) Date of Patent: Oct. 8, 2019

(54) CARE AREA GENERATION BY DETECTION OPTIMIZED METHODOLOGY

(71) Applicant: International Business Machines Corporation, Armonk, NY (US)

(72) Inventors: Ravi K. Bonam, Albany, NY (US); Nelson Felix, Briarcliff Manor, NY (US); Scott Halle, Slingerlands, NY (US); Luciana Meli, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/684,006

(22) Filed: Aug. 23, 2017

(65) Prior Publication Data

US 2019/0065634 A1    Feb. 28, 2019

(51) Int. Cl.
*G06F 17/50* (2006.01)
*H01L 21/00* (2006.01)
*H01J 37/32* (2006.01)

(52) U.S. Cl.
CPC ........ *G06F 17/505* (2013.01); *G06F 17/5081* (2013.01); *H01L 21/00* (2013.01); *G06F 2217/08* (2013.01); *G06F 2217/14* (2013.01); *H01J 37/32009* (2013.01)

(58) Field of Classification Search
CPC .................................................... G06F 17/505
USPC ....................................................... 716/104
See application file for complete search history.

(56) References Cited

U.S. PATENT DOCUMENTS

| | | | |
|---|---|---|---|
| 7,106,425 B1 | 9/2006 | Bultman et al. | |
| 7,434,198 B2* | 10/2008 | Strelkova | G03F 1/36 716/53 |
| 7,689,966 B2* | 3/2010 | Verma | G06F 17/5068 716/55 |
| 7,864,994 B2* | 1/2011 | Fidrich | A61B 90/36 382/128 |
| 8,213,705 B2 | 7/2012 | Chen et al. | |
| 8,502,979 B2 | 8/2013 | Levy et al. | |
| 9,053,259 B1* | 6/2015 | Gennari | G06F 17/5081 |
| 9,194,692 B1 | 11/2015 | Beye et al. | |
| 9,519,732 B1* | 12/2016 | Gennari | G06F 17/50 |

(Continued)

FOREIGN PATENT DOCUMENTS

JP    2013/535837 A    9/2013
WO    2015/066050 A1    5/2015

OTHER PUBLICATIONS

Ache, Alexander, et al., "Production Implementation of state-of-the-art Electron Beam", IEEE 2004, pp. 344-347.

(Continued)

*Primary Examiner* — Suchin Parihar
(74) *Attorney, Agent, or Firm* — Harrington & Smith

(57) ABSTRACT

A method comprises: defining a set of rules for an inspection and detection of a defect in two or more electronic devices on a semiconductor chip, the set of rules being based on a modulation transfer function providing a response as contrast versus spatial frequency of the pattern spacings of the two or more electronic devices on the semiconductor chip; generating two or more care areas for two or more pattern spacings of the electronic devices on the semiconductor chip using a hierarchical set of spacing rules; and inspecting the two or more pattern spacings of the electronic devices on the semiconductor chip for defects.

14 Claims, 13 Drawing Sheets

(56) References Cited

U.S. PATENT DOCUMENTS

| | | | |
|---|---|---|---|
| 9,865,512 B2 * | 1/2018 | Jayaraman | H01L 22/12 |
| 2001/0052257 A1 | 12/2001 | Magerle | |
| 2002/0122994 A1 * | 9/2002 | Cote | G03F 1/26 |
| | | | 430/5 |
| 2007/0157152 A1 * | 7/2007 | Strelkova | G03F 1/36 |
| | | | 716/52 |
| 2013/0252350 A1 | 9/2013 | Lee et al. | |
| 2013/0322736 A1 * | 12/2013 | Yu | G06T 7/001 |
| | | | 382/149 |
| 2014/0310670 A1 * | 10/2014 | Oberai | G06F 17/5081 |
| | | | 716/112 |
| 2015/0120220 A1 | 4/2015 | Wu et al. | |
| 2017/0194126 A1 * | 7/2017 | Bhaskar | H01J 37/28 |
| 2018/0275523 A1 * | 9/2018 | Biafore | G01N 21/8806 |

OTHER PUBLICATIONS

Bonam, Ravi, et al., "EUV Mask and Wafer Defectivity: Strategy and Evaluation for Full Die Defect Inspection", SPIE vol. 9776, 97761C, 2016, 8 pgs.

Chen, Chimin, et al., "Inspection Flow of Yield Impacting Systematic Defects", Joint Symposium of eMDC-2013 and ISSM-2013, 3 pgs.

Halle, Scott D., et al., "Toward Defect Guard-Banding of EUV Exposures by Full Chip Optical Wafer Inspection of EUV Mask Defect Adders", SPIE vol. 9422, Apr. 6, 2015, 13 pgs.

Meli, Luciana, et al, "Detection of Printable EUV Mask Absorber Defects and Defect Adders by Full Chip OPtical Inspection of EUV Patterned Wafers", IEEE 2016, pp. 72-77.

\* cited by examiner

CARE AREA GENERATION BY DETECTION OPTIMIZED METHODOLOGY

BACKGROUND

The exemplary embodiments described herein relate generally to semiconductor device processing and, more specifically, to methods for the inspection and analysis of semiconductor device layouts to generate semiconductor wafers having optimized designs.

Wafers of thin slices of semiconductor materials are used as substrates for microelectronic devices in the fabrication of integrated circuits. During the fabrication of such integrated circuits, the wafers may be subjected to various processing steps such as lithography, etching, ion implantation, and deposition of various materials to form the devices. The devices are arranged in patterns in efforts to take full advantage of spacing on the wafer. The finished product (devices on wafer) is an integrated circuit (IC) chip.

The area encompassing the patterns of the devices within the chip on the wafer define care areas, which are subject to inspection in order to detect defects (missing material, extra material, and pinholes) that may affect the operability of apparatuses into which the wafers are incorporated. The care areas are marker shapes or polygons within a particular space. The marker shapes that define a care area layout design contain polygons that are arranged to selectively target a particular pattern design of the device.

Process limited yield (PLY) is a function of the sensitivity of the wafer defect inspection process. The sensitivity of the wafer defect inspection process for a given set of device patterns and the variation of designs within the device are limited by wafer defect detection noise from the care area. Each care area group is uniquely optimized for signal/noise so that background noise from the care area is minimized. Discrimination with regard to the patterning/spacing of devices of interest from the background patterning (by optimized care area markers) allows for the sensitivity in the detection of defects, which in turn affects the PLY.

Current methodologies for the generation of care areas to be used for defect inspection generally only address a low percentage of the area of a chip and are limited to pre-selecting the devices themselves or pre-designated repeating patterns of devices. In particular, the devices and patterns are preselected for inspection, and any test scripting is generally crafted specifically to such preselected devices and patterns.

BRIEF SUMMARY

In one exemplary embodiment, a method comprises: defining a set of sampling rules for an inspection and detection of a defect in two or more electronic devices on a semiconductor chip. The rules are based on a modulation transfer function providing a response as contrast versus spatial frequency of the two or more electronic devices on the semiconductor chip; generating two or more care areas for two or more pattern spacings of the electronic devices on the semiconductor chip using a hierarchical set of spacing rules; and inspecting the two or more pattern spacings of the electronic devices on the semiconductor chip for one or more defects.

In another exemplary embodiment, a method for the inspection and detection of defects in electronic devices in care areas on a semiconductor chip comprises: determining a range of sizes and widths of spacings bins for pattern spacings of two or more electronic devices on a semiconductor chip, using a pattern spacing rule based on a modulation transfer function providing a response as contrast versus spatial frequency of the two or more electronic devices on the semiconductor chip; searching for and determining locations of the two or more electronic devices in the design space per the pattern spacing rule; defining a contiguous area based on the determined locations of the two or more electronic devices in the design space, wherein the contiguous area defines a care area, in order to place the care area to cover the contiguous area on the semiconductor chip; delivering the contiguous area defined as the care area to an inspection tool; making an assessment regarding resizing or restructuring the defined care area; and adjusting one or more of the pattern spacing rules and the defined care area to regenerate the care area as one or more second care areas on the semiconductor chip.

In another exemplary embodiment, an apparatus comprises: at least one processor; and at least one memory including computer program code, the at least one memory and the computer program code configured to, with the processor, cause the apparatus at least to: define a set of rules for an inspection and detection of a defect in two or more electronic devices on a semiconductor chip, the set of rules being based on a modulation transfer function providing a response as contrast versus spatial frequency of the two or more electronic devices on the semiconductor chip; generate two or more care areas for two or more pattern spacings of the electronic devices on the semiconductor chip using a hierarchical set of spacing rules; and inspect the two or more pattern spacings of the electronic devices on the semiconductor chip for one or more defects.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
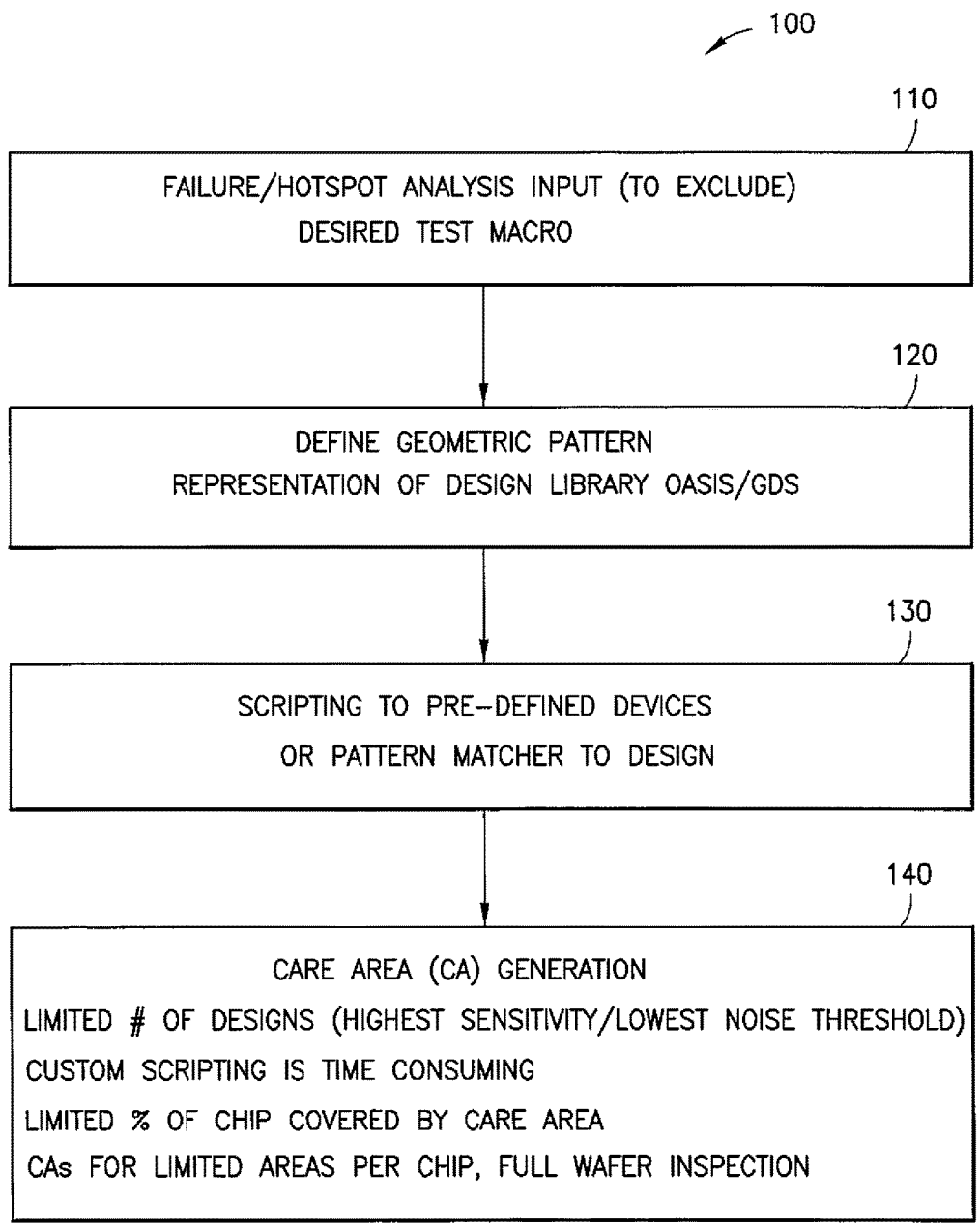
FIG. 1 is a flow for a pre-selected pattern-centric process for the generation of a care area for wafer inspection.

Referring to FIG. 1, one exemplary embodiment of a pre-selected pattern-centric approach or process for the generation of a care area (CA) for wafer inspection is designated generally by the reference number 100 and is hereinafter referred to as "process 100." Process 100 may be a "surgical" approach for the CA generation for the inspection of pre-selected devices on wafers in that only selected patterns that comprise a specific device on the wafer are inspected.

In the pre-selected pattern-centric approach of process 100, a failure/hot spot analysis can be an input, for a desired test macro, in order to include a particular pattern of a design area, as indicated in block 110. The selected devices are represented by polygons and circles in a design layout, as indicated in block 120, for example, in the format of a graphic database system (GDS) or OASIS file. Scripting to uniquely target each of the patterns according to a rule-based prescription of the composed pre-defined device may then be carried out, as indicated in block 130. In the alternative, the scripting may be based on a pattern matching of the design. As indicated in block 140, the CA is generated based on a limited number of unique patterns representative of the selected device. Since the CA is only defined for a small portion of the total design space, for each CA, the noise threshold can be uniquely optimized to provide a high detection sensitivity relative to the surrounding wafer environment. Custom scripting to uniquely target the individual pattern groupings that comprise an individual device in such a scenario may be time consuming and typically only cover a limited fraction of the total area of the chip. Thus, in the previous approaches, the CAs may be used for a limited number of inspection areas per chip, and such approaches may not be suitable for large area inspection of chips with large varieties of design patterns.

Figure 2:
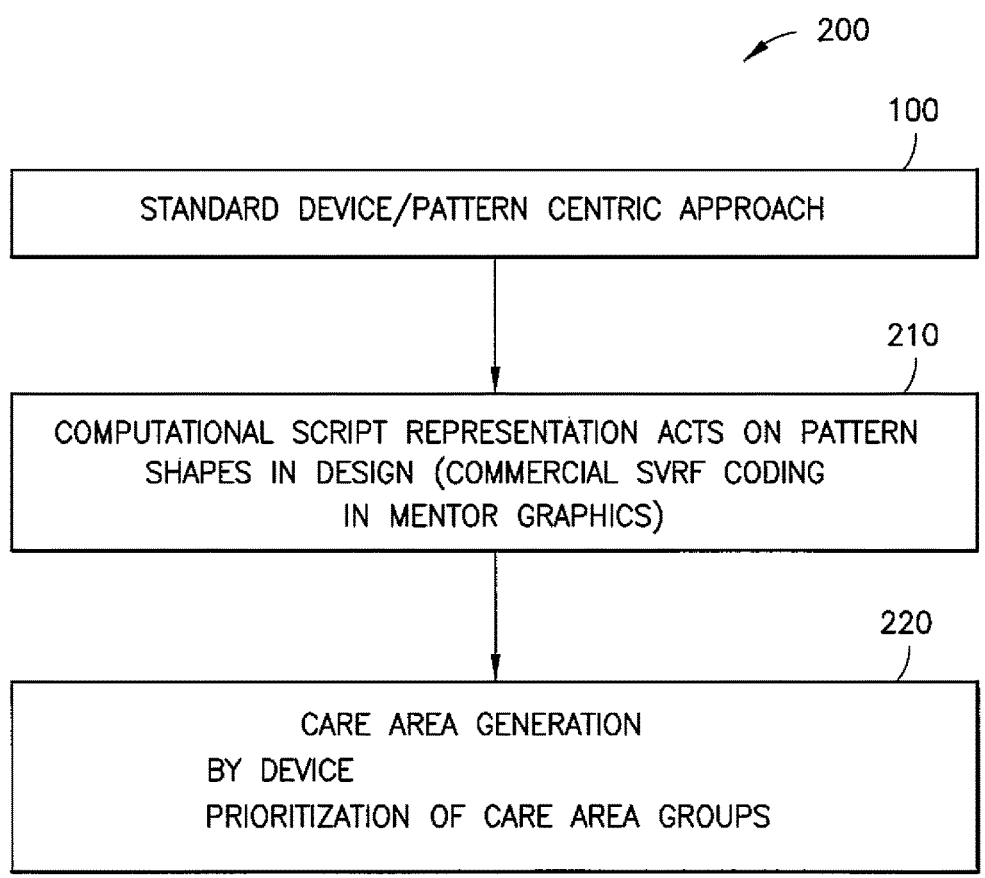
FIG. 2 is a flow illustrating the use of the process of FIG. 1.

Referring to FIG. 2, an illustration of how the pre-selected pattern-centric approach of process 100 may be used is shown generally at 200. The pre-selected pattern-centric approach of process 100 may employ a computational script to act on a variety of pattern shapes that are employed for selected devices in the design of the chip, as indicated in block 210. The computational script may be used with any suitable programming language that can uniquely identify the polygons and spacing between the polygons of the design layout space. In one exemplary embodiment, one suitable scripting language may be Standard Verification Rule Format (SVRF), for use with semiconductor design tools available from MENTOR GRAPHICS CORPORATION of Wilsonville, Oreg. Another suitable scripting language may be IC Validator (ICV), available from SYNOPSYS of Irvine, Calif. Using the computational script representation, CAs may be generated, with a prioritization of CA groups, which may be critical design patterns, as indicated in block 220.

Figure 3:
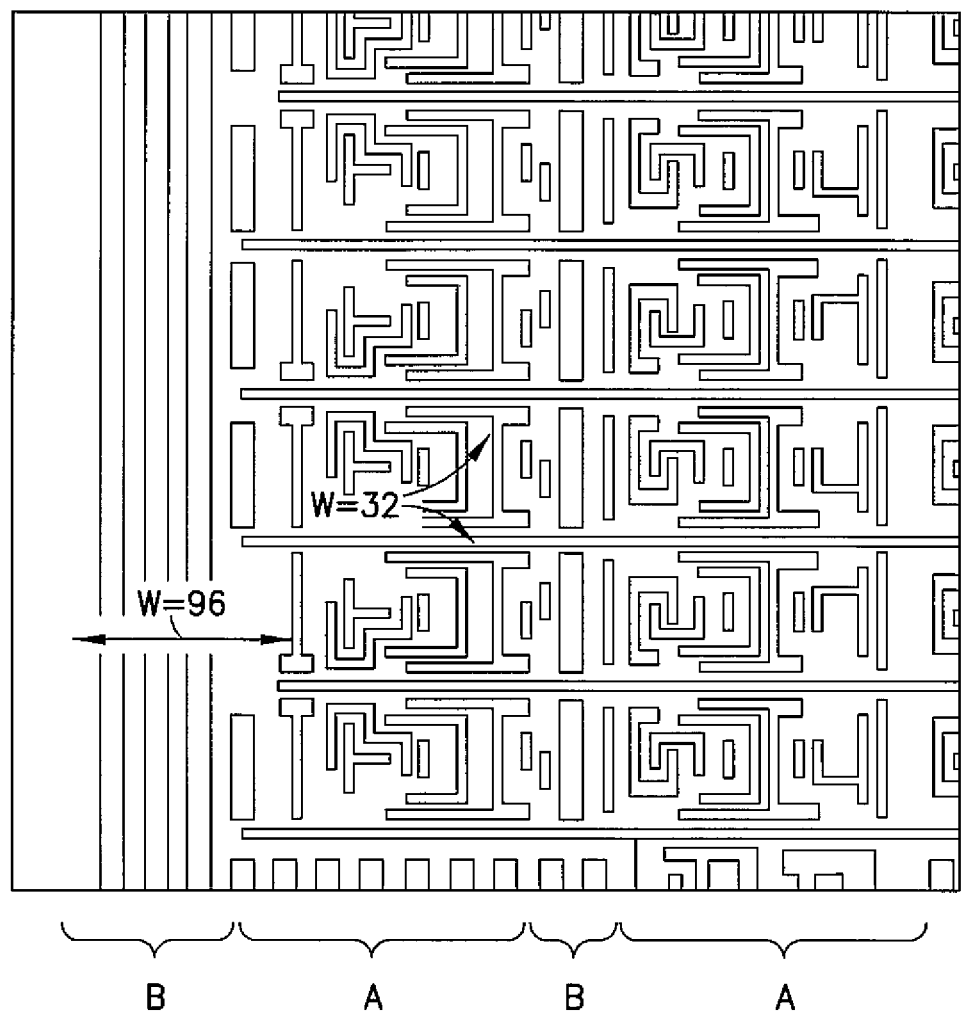
FIG. 3 is a schematic representation of one embodiment of a care area generation with design rules to form a layout.

Referring to FIG. 3, one exemplary embodiment of a CA generation with design rules to form a layout is shown generally at 300 and is hereinafter referred to as "layout 300." In layout 300, CA custom scripts may be used to uniquely locate pre-determined devices. The CA rules follow technology device design rules to target a given device for inspection for defects. The design rules may specify widths (W) of devices and spacing (S). For example, the design rules may specify, on a first layer A, W=32 nanometers (nm) as a rule check on the inside of a device (with 64 nm pitch) and, on a second layer B, W=96 nm as a rule check on an outside of a device.

Figure 4:
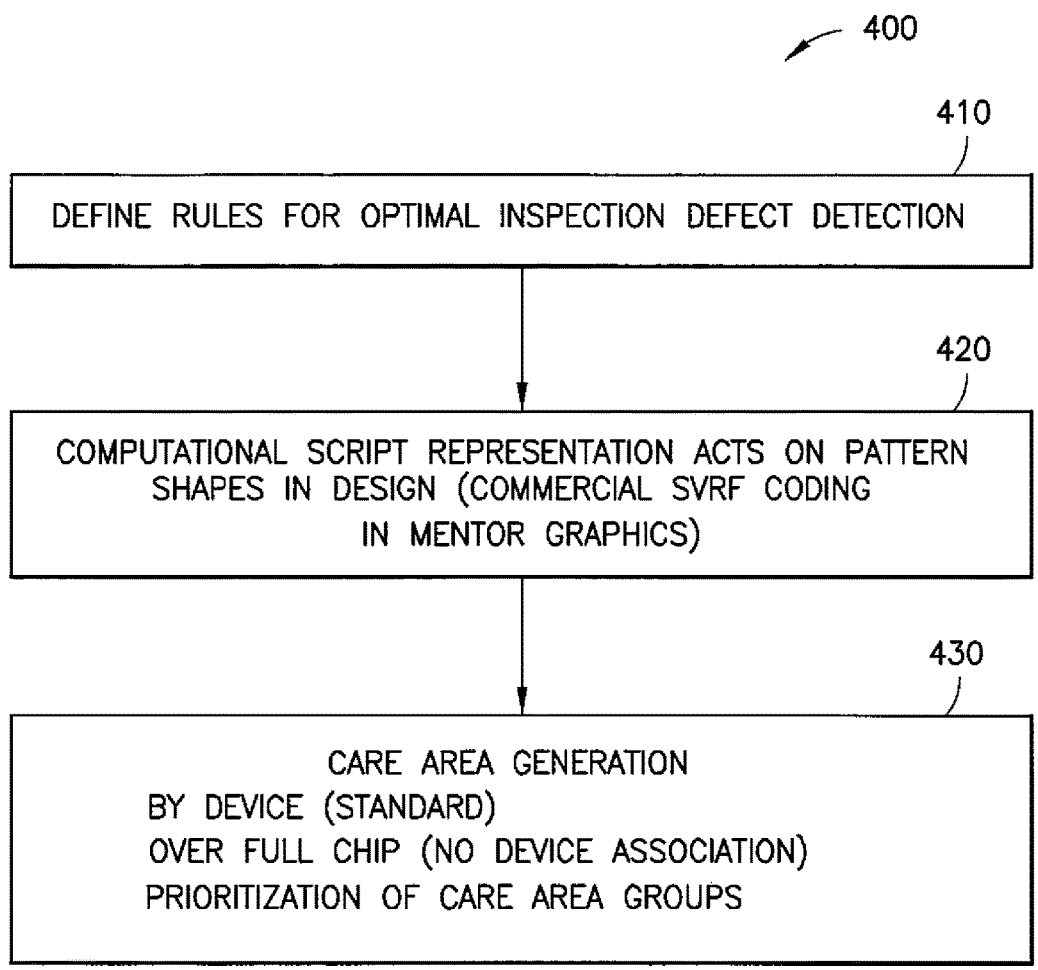
FIG. 4 is a flow of a generation of a full chip care area with design rules for inspection defect detection.

Referring now to FIG. 4, one exemplary embodiment of a generation of a full chip CA with design rules for optimal inspection defect detection is shown generally at 400 and is hereinafter referred to as "process 400." In process 400, a full area coverage (or at least a very high percentage) CA solution is possible. Devices and patterns do not require pre-selection for scripting, and the CAs can adequately cover all relevant patterns in the devices to enable optimal defect detection sensitivity.

In process 400, the rules for optimal inspection and detection of defects are defined, as indicated in block 410. As indicated in block 420, a computational script representation may be used with any suitable programming language (e.g., SVRF or IC Validator). Using the computational script representation, CAs may be generated corresponding to a hierarchical set of spacing rules, with a prioritization for setting the thresholds for detection sensitivities of CA groups over the full area of the chip without device association using a suitable mathematical algorithm, as indicated in block 430.

Figure 5:
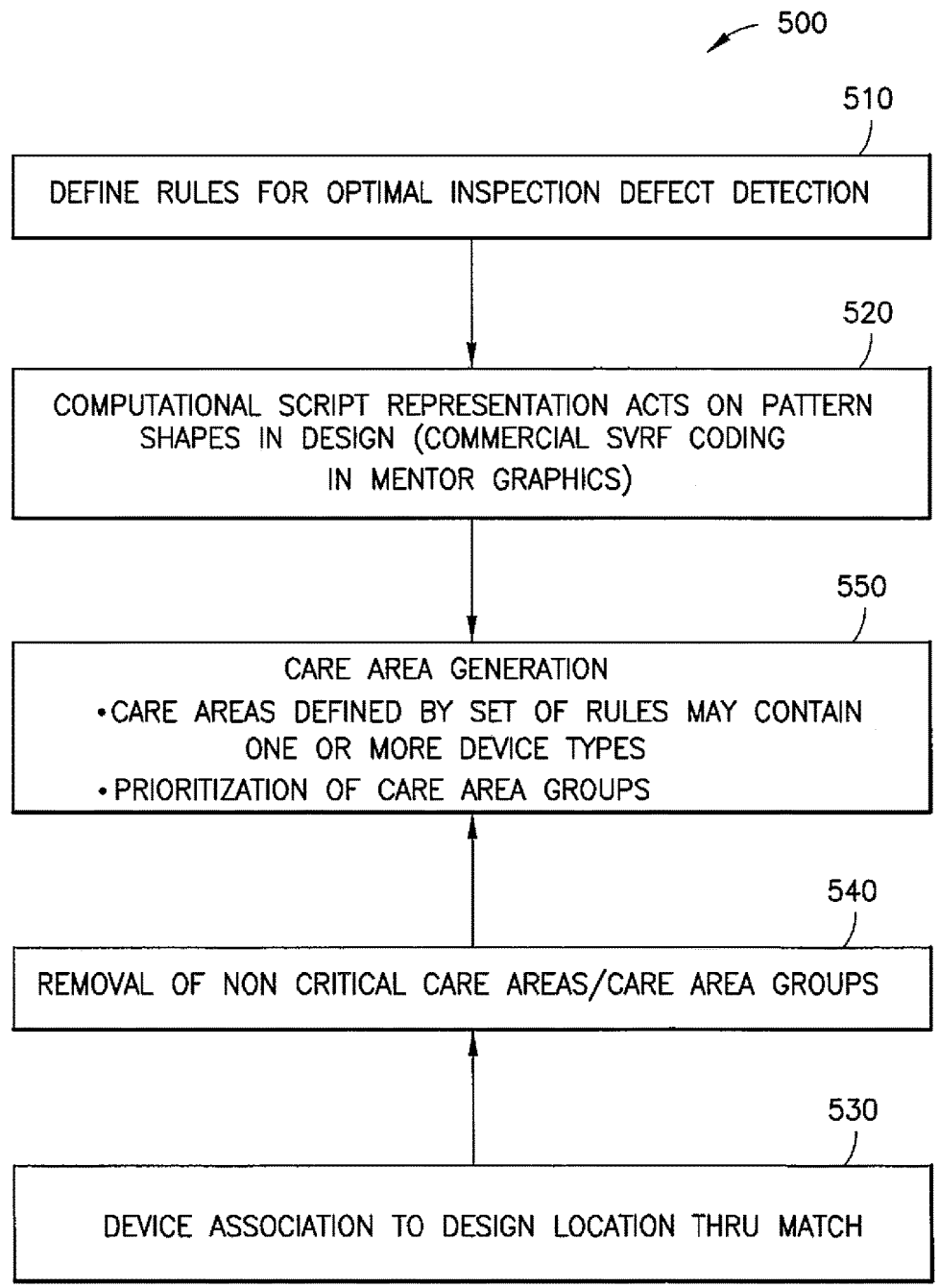
FIG. 5 is a flow of a process of one embodiment of the present invention in which care areas defined by a set of design rules may contain one or more device types.

Referring now to FIG. 5, another exemplary embodiment of a process 500 is shown in which a hierarchical set of spacing rules between polygons of the design layout enable CA generation without resorting to pre-defining a given-pattern of a device. In process 500, the rules for optimal inspection and detection of defects are defined, as indicated in block 510, and as indicated in block 520, a computational script representation may be used (e.g., with SVRF or IC Validator). As with process 400, the devices and patterns do not require pre-selection for scripting. In addition to the spacing rule-generation of CAs, pre-selecting a high repeating pattern for a device of interest at a design location through a matching algorithm, as indicated in block 530, may be followed by a removal of non-critical CAs and CA groups not associated with devices (e.g., pattern fill), as indicated in block 540.

Figure 6A:
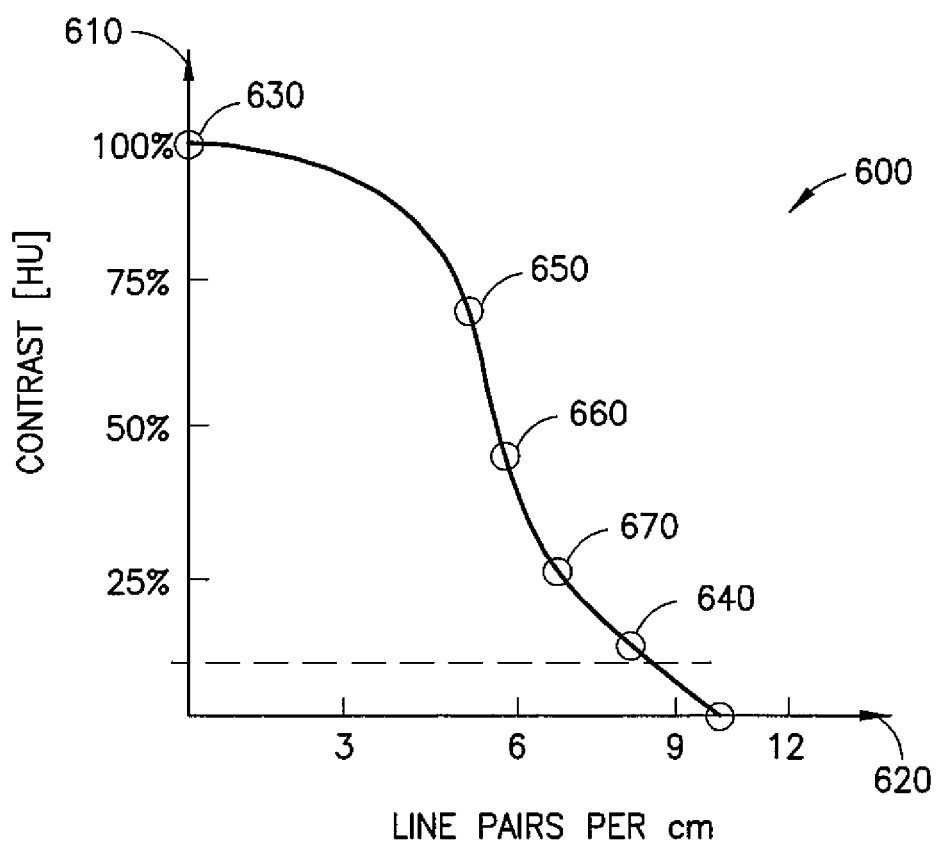
FIG. 6A is a graphical representation of a response of contrast versus spatial frequency.
Figure 6B:
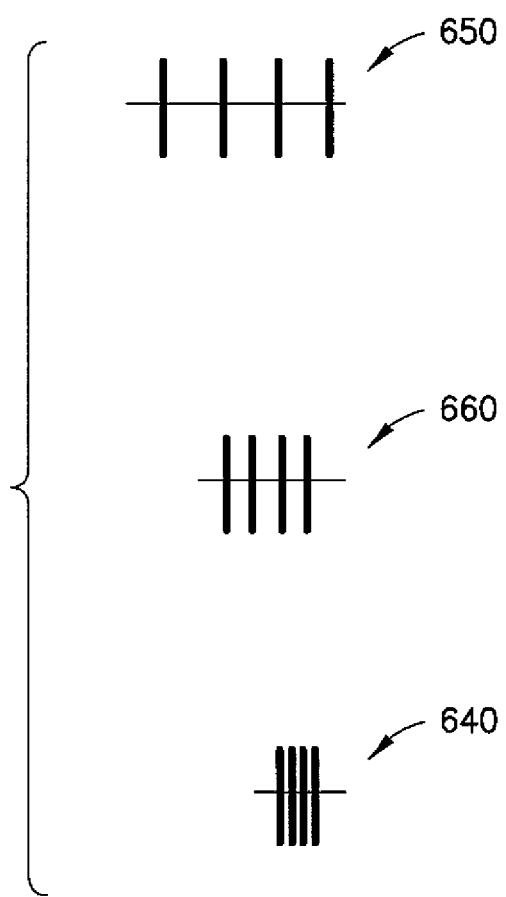
FIG. 6B is a schematic representation of exemplary devices showing different one dimensional line/space widths and pitches.

Referring now to FIGS. 6A and 6B, spacing rules are optimized for CA generation, which enable high signal-to-noise ratios for the detection of defects. The contrast for the detection of line spacing varies with the detector wavelength according to a modulation transfer function 600 (MTF 600) or the spatial frequency response, which represents the magnitude of the Fourier transform of the point or line spread function. The hierarchical set of spacing rules between polygons of the design layout follow the MTF 600 for the specific detector for optimal detection. This is manifested by larger spacing bins at lower spatial frequencies (largest spacings) and smaller spacing bins at higher spatial frequencies (smallest spacing) to maximize the contrast falloff. Exemplary suitable detectors used for defect detection sensitivity include, but are not limited to, broad-band bright-field plasma inspection apparatuses.

As shown in FIG. 6A, use of the detector with the MTF 600 provides a response in the graphical form of contrast 610 versus spatial frequency 620. For any given optical defect detection system, modulation transfer function typically follows the optical response curve indicated by MTF 600. The best detector contrast or response at the largest spacing (and smallest spatial frequency or the largest spacing value in the design) would be at a normalized value of 100%, which is indicated at 630. However, in such a scenario contrast is flat, as the number of line pairs per distance unit (e.g., centimeters (cm)) tends to approach zero in a perfect (non-realistic) system. A reduction of the detector contrast at small spacing is indicated at 640, which coincides with the highest spatial frequency (i.e., the smallest spacing between pattern features). The number of line pairs per distance unit in this scenario is 8. Intermediate values of detector contrast are shown at 650, 660, and 670, which correspond to numbers of line pairs per distance unit of 5, 6, and 7, respectively.

Figure 6C:
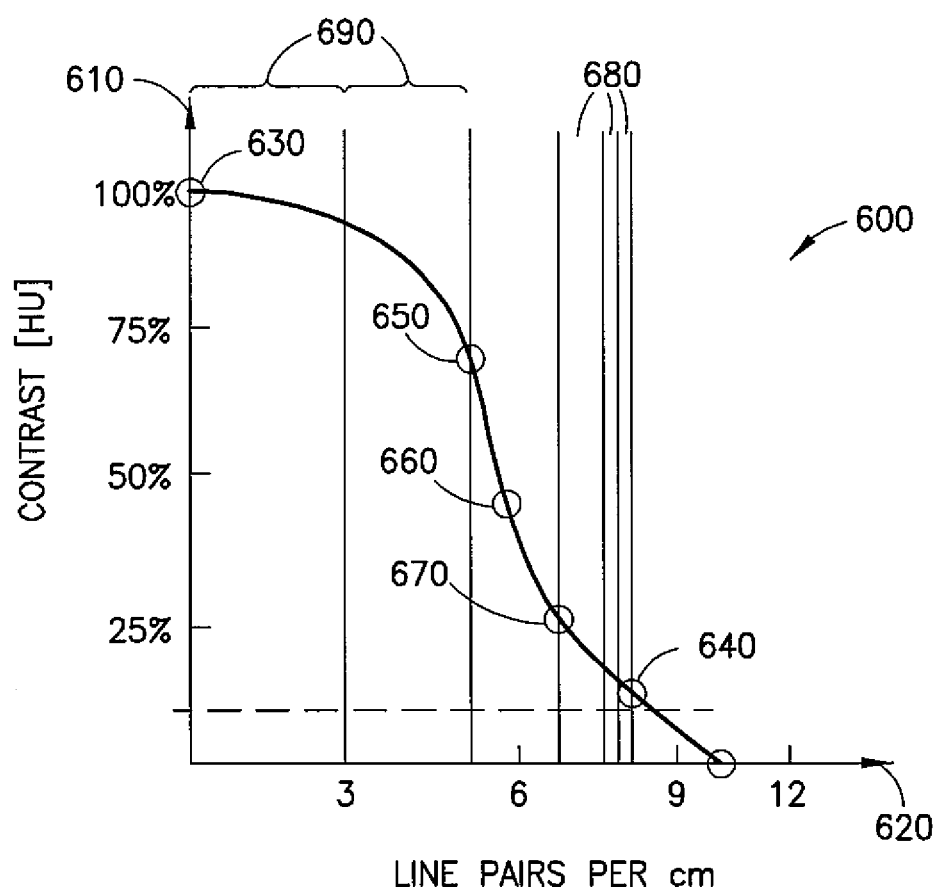
FIG. 6C is a schematic representation of space binning superimposed on an MTF curve.

As shown in FIG. 6B, the pattern shown at 640 with the smallest spacing width has reduced detector contrast at small width and pitch, which corresponds to the falloff of the MTF curve shown in FIG. 6A at 640. The pattern shown at 650 with a large spacing width and pitch corresponds to large and nearly flat contrast. A mid pitch pattern device with an intermediate value of detector contrast is shown at 660. In FIG. 6C, the space binning is shown superimposed on the MTF curve. To maximize the contrast reductions as the spacings between features gets smaller, smaller spacing bins 680 are used at higher spatial frequencies (i.e., at the smallest spacings), while larger spacing bins 690 are used at the lower spatial frequencies (i.e., at the largest spacings).

Figure 7A:
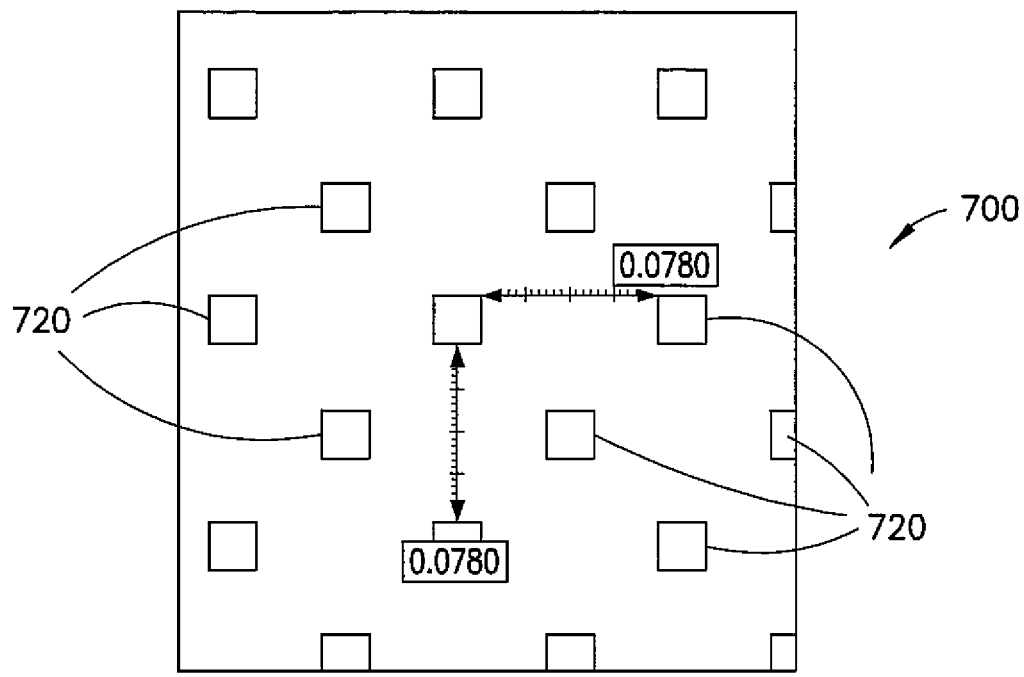
FIGS. 7A-7D are schematic representations of various contact and via pattern layouts.
Figure 7B:
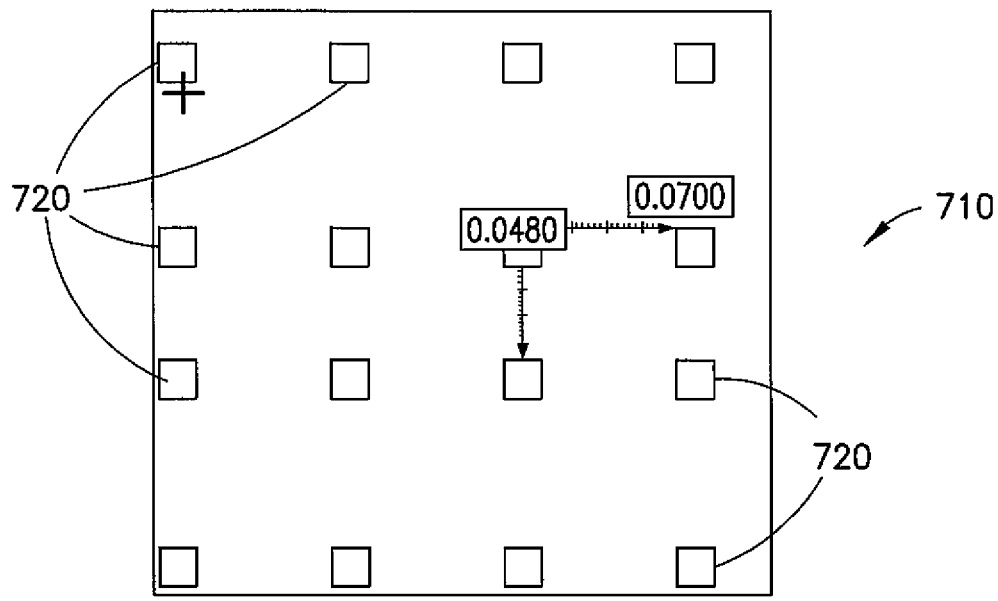
Figure 7C:
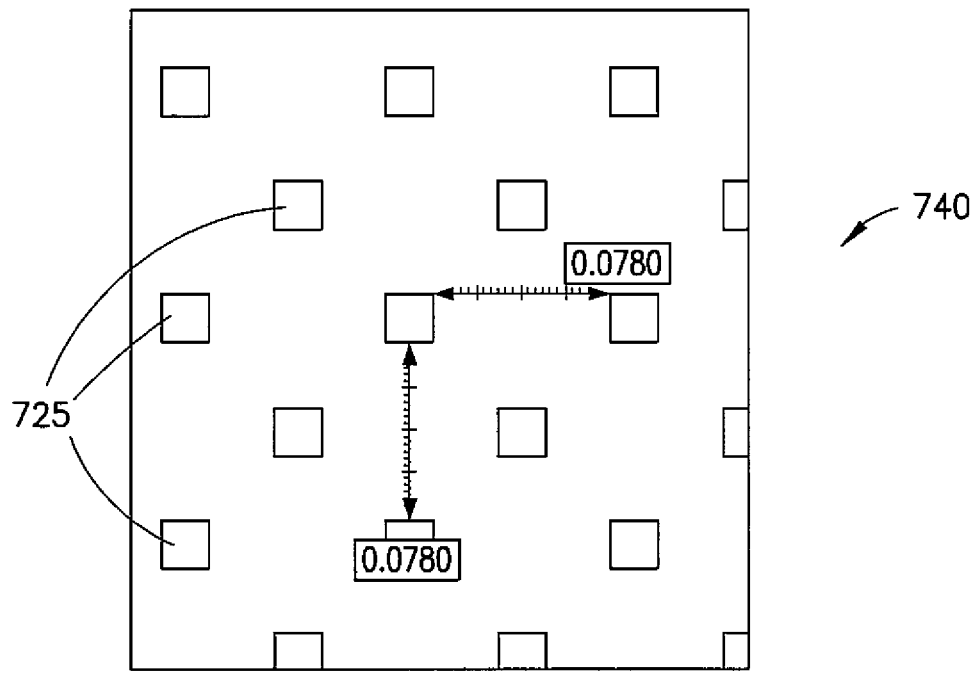
Figure 7D:
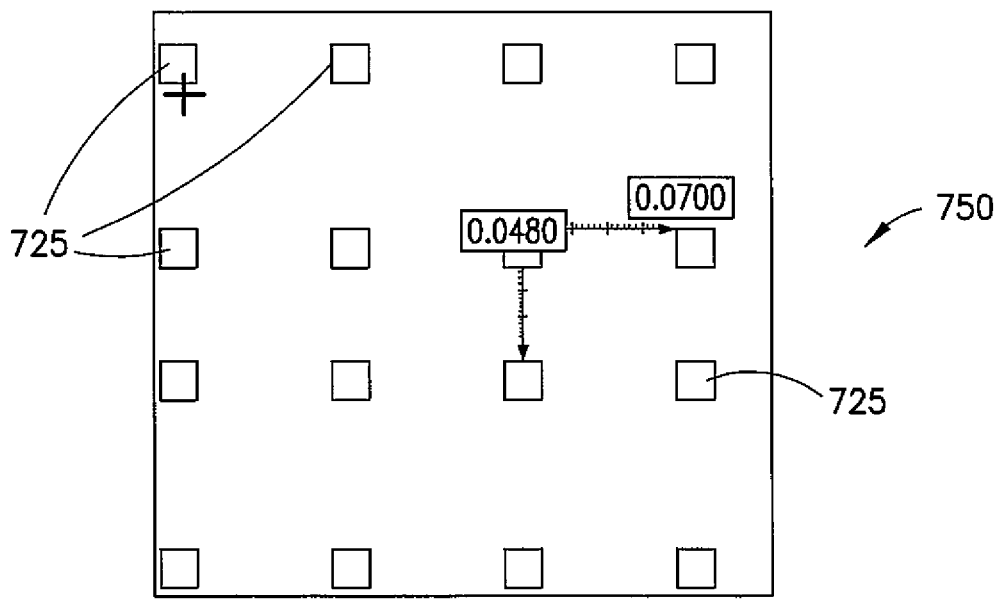

Referring now to FIGS. 7A and 7B, the impact of contrast/ MTF on spacing rules is shown. As shown in FIG. 7A, a design layout is shown at 700 in which the spacing between polygons (CAs 720) (x and y directions) is 0.078. As shown in FIG. 7B, a design layout is shown at 710 in which the spacing between polygons (CAs 720) is 0.0700 in the x direction and 0.0480 in the y direction. Both design layouts 700, 710 can either fall into distinct CAs or can fall into the same CA group depending on the implementation of the space binning, as defined by the MTF. The generic spacing rules for CA generation (distances between polygons in devices) are distinct from conventional CA generation that specifically targets particular specific technology device design rules for device width (W) or highest frequency spacing (S). As shown in FIGS. 7C and 7D, different CAs 725 may be implemented for each pattern (740 in FIG. 7C and 750 in FIG. 7D), as determined by the bin widths and locations on the MTF curve. This is in contrast to FIGS. 7A and 7B, where the same CAs (CAs 720) are used for both patterns, as determined by the bin widths and locations on the MTF curve.

Based on the above, spacing rules (both the bin size of the spacing and the values of the spacings) for CA generations are constructed between the lowest and highest frequencies, corresponding to the largest and the shortest distance between polygons in the design. The CAs are defined starting at the smallest spacing allowed by design to the largest spacing. Upon detection by the detector, since the small spacing rules are most limited in contrast, they are prioritized over larger spacing rules for signal-to-noise detection thresholds. For a given spacing rule, several pattern types may be included in a defined CA. Larger spacing rules may include groupings of some of the mid-frequency spacings. An additional constraint on the contrast is present when the maximum CA covering the design fails to fill the detector field of view (typically ranging greater than 5-10 by 5-10 microns).

Figure 8:
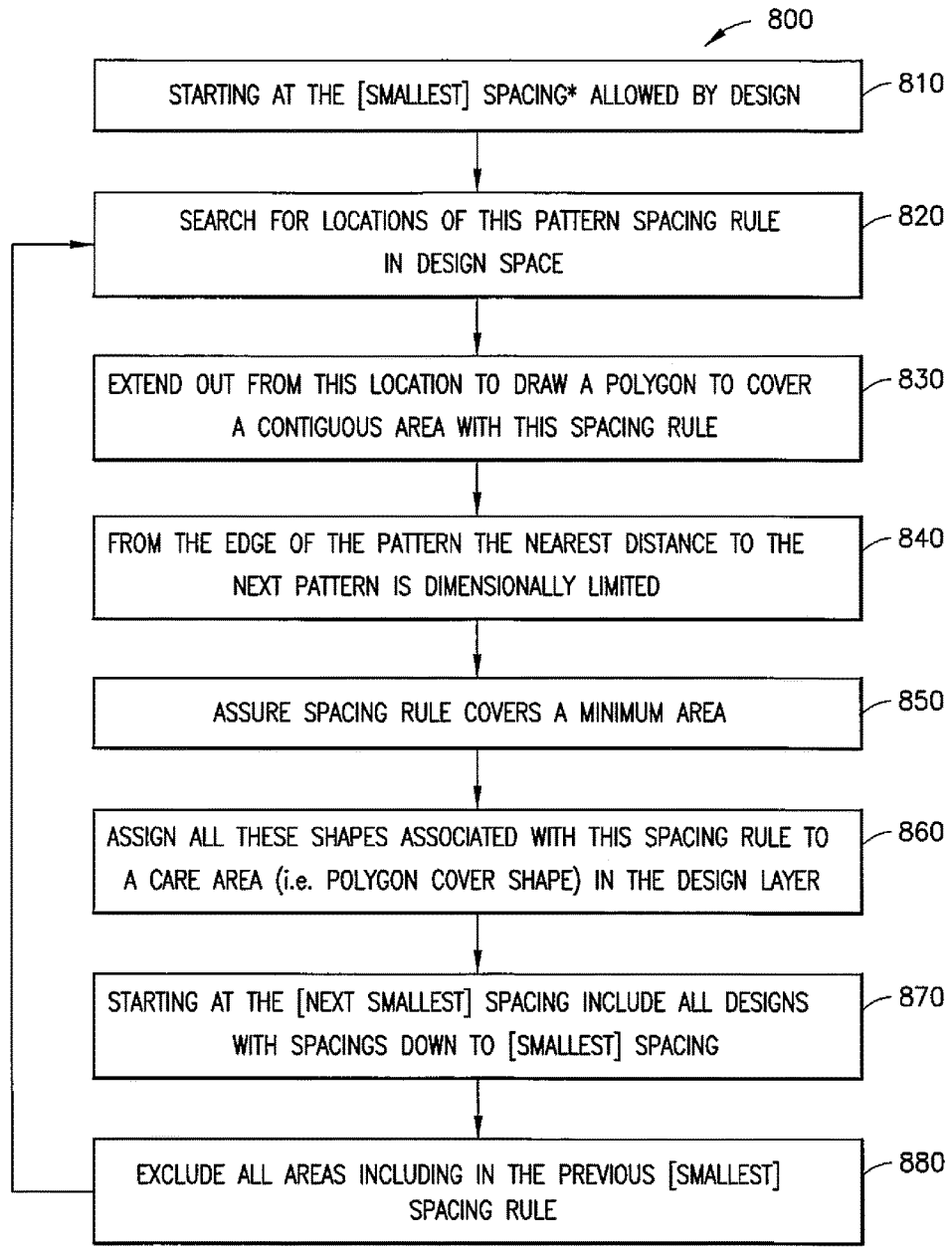
FIG. 8 is a flow of a methodology for a detector optimized spacing rule for creating care areas without pre-selection of devices.

Referring now to FIG. 8, a methodology for a detector optimized spacing rule is shown generally at 800 and is hereinafter referred to as "methodology 800." In methodology 800, the smallest spacing (minimum size and width of a spacing bin) allowed by design is determined, as indicated in block 810. The smallest spacing could be implemented for each orientation of a device. As indicated in block 820, locations of devices in the design space per the pattern spacing rule are searched for in the design layout that corresponds to the spacing rules of the CA. Based on a returned location from block 820, an area may be extended out from the location to draw a polygon to cover a contiguous area as per the spacing rule (block 830). As indicated in block 840, from an edge of the pattern, the nearest distance to the next pattern may be dimensionally limited. As indicated in block 850, the spacing rule may be assured to cover a minimum area so the contrast is not limited, as described above. All shapes associated with the spacing rule with a spacing bin of dimensions x to y may be assigned to a CA (a polygon cover shape) in the design layer, as indicated in block 860. Then, starting at the next largest spacing bin, all designs with spacings down to the largest spacing are included, as indicated in block 870. As shown in block 880, all areas included in the previous smaller spacing rule are then excluded. Control is then passed back to block 820, and the process is continued. This continues until the finite number of spacing rules bins defined have been exercised.

Figure 9:
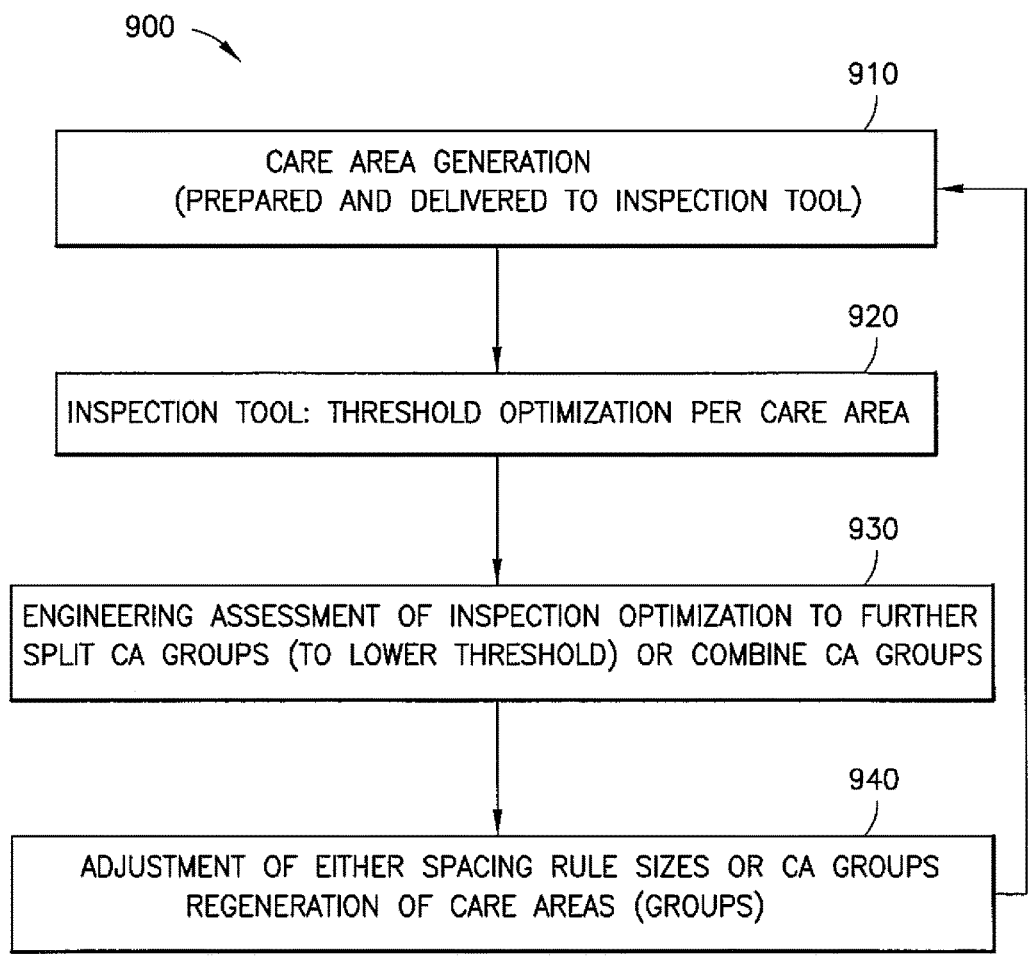
FIG. 9 is a flow of an implementation of the detector optimized spacing rule methodology of FIG. 8 by adjustment of thresholds for each care area.

Referring now to FIG. 9, an implementation of the detector optimized spacing rule methodology is shown generally at 900 and is referred to as "implementation 900." In implementation 900, a CA is generated, as indicated in block 910. In block 910, the generated CA is prepared and delivered to an inspection tool. As indicated in block 920, a threshold is optimized for each CA. In block 930, an engineering assessment of the inspection optimization is made. In the assessment, a determination is made whether to further split CA groups or to combine CA groups (e.g., using a mathematical algorithm such as MTF 600). As indicated in block 940, an adjustment of either spacing rule sizes or CA groups is made. Doing so regenerates the CAs (or CA groups). Control is then passed back to block 910 for a reiteration of the methodology. A suitable electronic device may then be fabricated or manufactured based on design rules embodied in the methodology and implementation 900.

Figure 10:
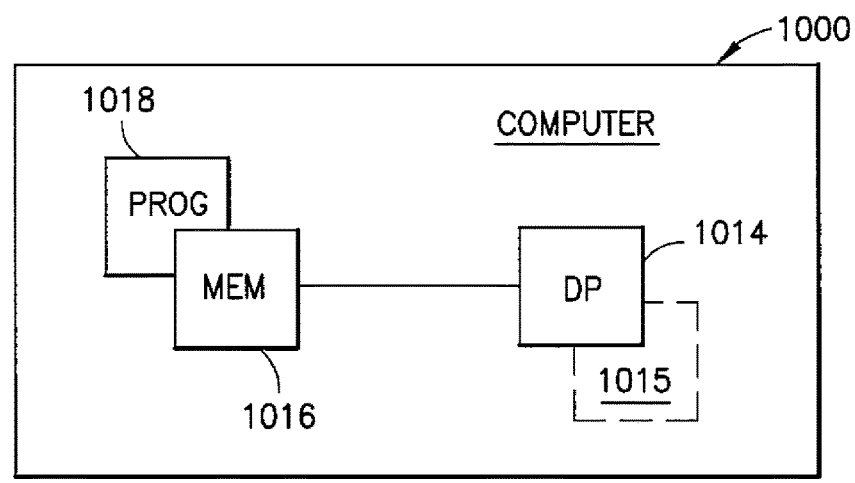
FIG. 10 is a block diagram of various electronic devices and apparatuses that are suitable for use in practicing the exemplary embodiments described herein.

Referring now to FIG. 10, a simplified block diagram of various electronic devices and apparatuses that are suitable for use in practicing the exemplary embodiments described herein is shown. For example, a computer 1010 may be used to control one or more of the fabrication processes (e.g., fabrication of a device having CAs generated from the defined design rules, manufacture of a semiconductor chip having an electronic device, and the like) as described above. The computer 1010 includes a controller, such as a computer or a data processor (DP) 1014 and a computer-readable memory medium embodied as a memory (MEM) 1016 that stores a program of computer instructions (PROG) 1018.

The PROG 1018 includes program instructions that, when executed by the associated DP 1014, enable the various electronic devices and apparatuses to operate in accordance with exemplary embodiments. That is, various exemplary embodiments may be implemented at least in part by computer software executable by the DP 1014 of the computer 1010, or by hardware, or by a combination of software and hardware (and firmware).

The computer 1010 may also include dedicated processors, for example processor 1015 used for the fabrication of devices having CAs generated from the defined design rules, and the like.

The computer readable MEM 1016 may be of any type suitable to the local technical environment and may be implemented using any suitable data storage technology, such as semiconductor based memory devices, flash memory, magnetic memory devices and systems, optical memory devices and systems, fixed memory, and removable memory. The DP 1014 may be of any type suitable to the local technical environment, and may include one or more of general purpose computers, special purpose computers, microprocessors, digital signal processors (DSPs), and processors based on a multicore processor architecture, as non-limiting examples.

The exemplary embodiments, as discussed herein and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise utilizing the exemplary embodiments of the method.

Referring now to all the Figures, it is desired to obtain the optimized highest contrast for all patterns. Each repeating pattern area whose distance between design features matches the space rule is enclosed by a CA. In order to obtain such a contrast:

There is no dead space (open areas) in the CAs.
The spacing rules may be defined per mask layer per technology. Rules may be orientation specific or agnostic.
There is no crossing from an open area to a device array as such wires are removed.
The detection tool is observed to provide a high sensitivity and low noise threshold.
Each CA group marker may be defined in a separate layer. In each CA group, there may be 200,000 or more CAs. The number of CA groups is limited by the inspection tool. For example, the more CA groups that are present, the higher the sensitivity of defect detection (i.e., better sensitivity optimization and noise threshold per care area group).
The design space covered by a CA may approach 100%.

In one exemplary embodiment, a method comprises: defining a rule for an inspection and detection of a defect in two or more electronic devices on a semiconductor chip, the rule being based on a modulation transfer function providing a response as contrast versus spatial frequency of the two or more electronic devices on the semiconductor chip; generating two or more care areas for two or more pattern spacings of the electronic devices on the semiconductor chip using a hierarchical set of spacing rules; and inspecting the two or more pattern spacings of the electronic devices on the semiconductor chip for defects.

The method may further comprise grouping the generated two or more care areas into two or more care groups. Generating two or more care areas for the two or more pattern spacings of the electronic devices on the semiconductor chip using a hierarchical set of spacing rules may comprise using a programming language to obtain a computational script representation. Generating two or more care areas for the two or more pattern spacings of the electronic devices on the semiconductor chip using a hierarchical set of spacing rules may comprise prioritizing thresholds for detection sensitivities of the two or more care groups over a full area of the semiconductor chip. The method may further comprise associating the two or more electronic devices to a corresponding design location. The associating of the two or more electronic devices to a corresponding design location may be carried out using a matching algorithm. Inspecting the two or more electronic devices on the semiconductor chip for one or more defects may comprise detecting the one or more defects using a plasma inspection apparatus. The method may further comprise correcting any detected defects in the two or more electronic devices and fabricating the semiconductor chip with the corrected electronic devices.

In another exemplary embodiment, a method for the inspection and detection of defects in electronic devices in care areas on a semiconductor chip comprises: determining a minimum size and width of a spacing bin, for pattern spacings of two or more electronic devices on a semiconductor chip, using a pattern spacing rule based on a modulation transfer function providing a response as contrast versus spatial frequency of the two or more electronic devices on the semiconductor chip; searching for and determining locations of the two or more electronic devices in the design space per the pattern spacing rule; defining a contiguous area based on the determined locations of the two or more electronic devices in the design space, wherein the contiguous area defines a care area, in order to place the care area to cover the contiguous area on the semiconductor chip; delivering the contiguous area defined as the care area to an inspection tool; making an assessment regarding resizing or restructuring the defined care area; and adjusting one or more of the pattern spacing rule and the defined care area to regenerate the care area as one or more second care areas on the semiconductor chip.

The method may further comprise, after defining a contiguous area based on the determined locations of the two or more electronic devices in the design space, optimizing a threshold for the contiguous area. Determining a minimum spacing, for the two or more electronic devices on a semiconductor chip, using a pattern spacing rule, may comprise using a computational script representation. Using a computational script representation may comprise using Standard Verification Rule Format language or IC Validator language. Making an assessment regarding resizing or restructuring the defined care area may comprise making an assessment based on a mathematical algorithm.

In another exemplary embodiment, an apparatus comprises: at least one processor; and at least one memory including computer program code, the at least one memory and the computer program code configured to, with the processor, cause the apparatus at least to: define a rule for an inspection and detection of a defect in two or more electronic devices on a semiconductor chip, the rule being based on a modulation transfer function providing a response as contrast versus spatial frequency of the two or more electronic devices on the semiconductor chip; generate two or more care areas for two or more pattern spacings of the electronic devices on the semiconductor chip using a hierarchical set of spacing rules; and inspect the two or more pattern spacings of the electronic devices on the semiconductor chip for defects.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. A method, comprising:
    defining a set of rules for an inspection and detection of a defect in two or more electronic devices on a semiconductor chip, the set of rules being based on a modulation transfer function providing a response as contrast versus spatial frequency of the two or more electronic devices on the semiconductor chip;
    generating two or more care areas for two or more pattern spacings of the electronic devices on the semiconductor chip using a hierarchical set of spacing rules; and
    inspecting the two or more pattern spacings of the electronic devices on the semiconductor chip for one or more defects.

2. The method of claim 1, further comprising grouping the generated two or more care areas into two or more care groups.

3. The method of claim 1, wherein generating two or more care areas for the two or more pattern spacings of the electronic devices on the semiconductor chip using a hierarchical set of spacing rules comprises using a programming language to obtain a computational script representation.

4. The method of claim 2, wherein generating two or more care areas for the two or more pattern spacings of the electronic devices on the semiconductor chip using a hierarchical set of spacing rules comprises prioritizing thresholds for detection sensitivities of the two or more care groups over a full area of the semiconductor chip.

5. The method of claim 1, further comprising associating the two or more pattern spacings of the electronic devices to a corresponding design location.

6. The method of claim 5, wherein the associating of the two or more pattern spacings of the electronic devices to a corresponding design location is carried out using a matching algorithm.

7. The method of claim 1, wherein inspecting the two or more pattern spacings of the electronic devices on the semiconductor chip for one or, more defects comprises detecting the one or more defects using a plasma inspection apparatus.

8. The method of claim 1, further comprising correcting any detected defects in the two or more pattern spacings of the electronic devices and fabricating the semiconductor chip with the corrected electronic devices.

9. A method for the inspection and detection of defects in electronic devices in care areas on a semiconductor chip, the method comprising:
    determining a range of sizes and widths of spacings bins for pattern spacings associated with two or more electronic devices on a semiconductor chip, using a pattern spacing rule based on a modulation transfer function providing a response as contrast versus spatial frequency of the two or more electronic devices on the semiconductor chip;
    searching for and determining locations in order to place the care areas that will cover the two or more electronic devices in the design space per the pattern spacing rule;
    defining a contiguous area based on the determined locations of the two or more electronic devices in the design space, wherein the contiguous area defines a care area, in order to place the care area to cover the contiguous area on the semiconductor chip;
    delivering the contiguous area defined as the care area to an inspection tool;
    making an assessment regarding resizing or restructuring the defined care area; and
    adjusting one or more of the pattern spacing rule and the defined care area to regenerate the care area as one or more second care areas on the semiconductor chip.

10. The method of claim 9, further comprising, after defining a contiguous area based on the determined locations of the two or more electronic devices in the design space, optimizing a threshold for the contiguous area.

11. The method of claim 9, wherein determining a minimum spacing, for the two or more electronic devices on a semiconductor chip, using a pattern spacing rule, comprises using a computational script representation.

12. The method of claim 11, wherein using a computational script representation comprises using Standard Verification Rule Format language or IC Validator language.

13. The method of claim 11, wherein making an assessment regarding resizing or restructuring the defined care area comprises making an assessment based on a mathematical algorithm.

14. An apparatus, comprising:
    at least one processor; and
    at least one memory including computer program code, the at least one memory and the computer program code configured to, with the processor, cause the apparatus at least to:
    define a set of rules for an inspection and detection of a defect in two or more electronic devices on a semiconductor chip, the set of rules being based on a modulation transfer function providing a response as contrast versus spatial frequency of the two or more electronic devices on the semiconductor chip;
    generate two or more care areas for two or more pattern spacings of the electronic devices on the semiconductor chip using a hierarchical set of spacing rules; and
    inspect the two or more pattern spacings of the electronic devices on the semiconductor chip for one or more defects.

* * * * *